INVENTOR.
ALDEN I. McFARLAN
BY Daily + Daily
ATTORNEYS

Patented Apr. 4, 1950

2,502,527

UNITED STATES PATENT OFFICE 2,502,527

QUICK-FREEZING

Alden I. McFarlan, Westfield, N. J.

Application October 23, 1946, Serial No. 705,057

6 Claims. (Cl. 62—104)

The object of this invention is to provide a method and apparatus for the fast freezing of foods which will be more efficient and economical than present methods and apparatus. It is also useful for freezing other products, such as chemicals and drugs, especially blood plasma, penicillin and streptomycin, which must be frozen and sublimated at low temperatures, and for cold treatment of metals, shrinking of rivets, etc.

A feature of the invention is the immersion freezing of foods in a non-toxic liquid refrigerant.

Another feature of the invention is the provision of means to permit a high load factor with a relatively low compression capacity by temporary storage of relatively large quantities of the refrigerant at low pressure following each loading and freezing operation.

Another feature of the invention is the provision of simple means for removing the liquid refrigerant from the freezing chamber with minimum loss of refrigerant and with a minimum introduction of air and moisture.

Another feature of the invention is the provision of means for immersion freezing under pressure in order to increase the efficiency and utility of the apparatus.

Other features will be apparent as the description proceeds.

One of the principal problems in connection with the commercial fast freezing of foods is the high peak load. That is, when a particular crop ripens and is ready to be picked and frozen the operations must be performed rapidly if the crop is to be frozen while at its best. The bottleneck in this operation is the actual freezing operation itself which, as at present practiced, usually takes from one to three hours or even more.

Considering only the freezing cycle, production can be increased by:

1. Adding more equipment, including compressors, condensers, freezing apparatus, piping, motors, buildings, etc.

2. Increasing the compression cycle to produce a lower temperature, thereby increasing production with existing freezing equipment.

3. Devising new equipment that will reduce the freezing time in some way so as to increase production in the same or reduced space now occupied by conventional freezing apparatus.

The first method is often impractical as the plant may be sufficiently large for most of the year and increasing it for short peak demands such as the pea crop may not be justified on the basis of reducing the overall load factor.

The second scheme is impractical if the plant was properly designed in the first place, since a well designed plant utilizes the most efficient operating temperature. Furthermore, with the more common refrigerants such as ammonia or the common Freons as the refrigerant it becomes increasingly costly to reduce the temperatures below about $-25°$ F. with conventional apparatus.

My method and apparatus, therefore, offers a solution of this problem along the lines of the third possibility.

In order to overcome the slowness of the actual freezing operation, attempts have been made in the past to improve the heat transfer from the food to the refrigerant in order to decrease the freezing time. For this purpose air blasts have been used, belts have been used to convey the food below cold brine, food has been frozen in cold cans similar to ice cans in an ice tank, and cooling plates have been used. In all of these methods there still remains some air between the refrigerant and the food. As air is a poor heat conductor this necessarily slows down the operation. The ideal method of food freezing would involve (1) the most direct method of heat transfer from the refrigerant to the product, and (2) the complete elimination of air.

I have discovered by actual experiment that food may be fast frozen by immersion in non-toxic liquid refrigerant with excellent results. With the refrigerant in direct contact with the food all intermediate resistance to heat transfer is eliminated whether that of a metal plate or of air, and the high turbulence created by the immersion of a warm product in a low temperature refrigerant further tends to increase the transfer rate as compared with transmission through an intermediate retarding medium.

I have discovered that nitrous-oxide and Freon 12 (dichlorodifluoromethane), as well as Freon 22 (monochlorodifluoromethane) are all satisfactory refrigerants for opertion in this manner. All are non-toxic, one of the common uses for nitrous-oxide today being to mix it with cream under pressure for the purpose of producing whipped cream at soda fountains and bakeries. Nitrous-oxide is a liquid at atmospheric pressure at $-128°$ F., Freon 12 at $-21°$ F., and Freon 22 at $-40°$ F. I have actually frozen a pie in liquid nitrous-oxide at atmospheric pressure in fifteen minutes, which would require approximately two hours to freeze by present freezing methods. The use of my direct immersion method produces a better product, considerable saving in space, equipment, buildings, etc., and reduces first cost of the plant.

In order to utilize my method I have devised the apparatus illustrated in the drawings, in which—

Figure 1:
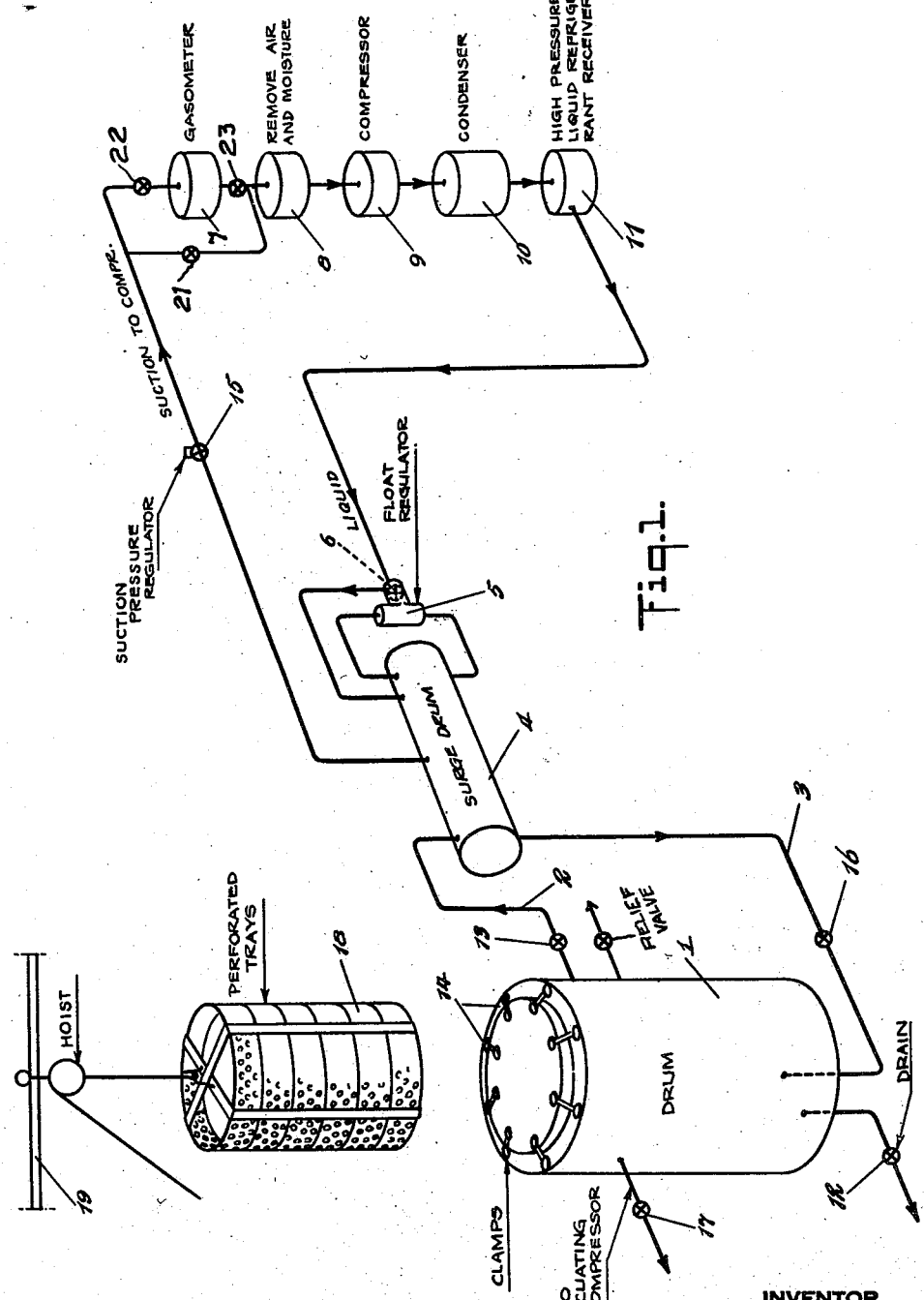
Figure 1 is a diagrammatical illustration of apparatus for immersion fast freezing of food.

In Figure 1 there is a kettle or drum 1, which may be opened to permit the insertion therein of the food to be frozen and which may be closed tightly with clamps 14 during the freezing process. Communicating with the drum 1 by means of the pipes 2 and 3 is an accumulator or surge drum 4 having therein a float 5 operating a valve 6 to maintain the liquid refrigerant therein at not less than a predetermined level. Communicating with the accumulator 4 is a gasometer or gas storage device 7 with an intervening suction pressure regulator 15. Following the gasometer 7 is a device 8 for removing air and moisture from the refrigerant, a compressor 9, a condenser 10 and a high pressure liquid refrigerant receiver 11. In the device are valves 12, 13, 16 and 17 which may be hand, solenoid or motor operated.

In operation the drum 1 will be opened, with valves 12, 13, 16 and 17 closed, and the food to be frozen will be inserted within the drum 1. This may be done by using perforated trays 18 moved on track 19 as illustrated. The lid of the drum will then be clamped securely in place, making an air and refrigerant tight seal. The air may be evacuated if desired through valve 17, which will be opened for the purpose. Valve 17 will then be closed and valves 13 and 16 will be opened. The refrigerant from the accumulator 4 will flow through pipe 3 into the drum 1, filling it with liquid refrigerant. The food therein being in direct contact with the liquid refrigerant, will be rapidly frozen. After the food has been within the drum 1 for the prescribed length of time the valve 13 will be closed. Continued evaporation of the refrigerant within the drum 1 will form a pressure within this drum which will force the liquid refrigerant back through pipe 3 into the accumulator 4.

When all the liquid refrigerant has been forced out of the drum 1 the valve 16 will be closed, thus closing off all liquid refrigerant from access to the drum 1. The drum 1 will, however, be under pressure. The valve 17 will be opened to evacuate the remaining refrigerant, then closed and valve 12 opened, opening the drum 1 to the atmosphere and releasing this pressure. The drum may then be opened, the food removed, and a new load of food placed within it, when it will again be closed and the cycle repeated.

Refrigerant vapor from the drum 1 and from the accumulator 4 will pass from the accumulator into the gasometer 7. This will store any excess of gaseous refrigerant which is produced during any freezing operation so that the compressor 9 may operate continuously and be able to take care of the intermittent high refrigeration loads imposed upon the system by successive charges of food within the drum 1.

Each time the drum 1 is opened to place a new load of food therein some air and moisture will necessarily get into the drum. These will be removed from the system in the device 8 before the refrigerant passes to the compressor 9.

I prefer to operate my system above atmospheric pressure. At a pressure of 150 pounds absolute pressure the boiling point of nitrous-oxide is approximately −44° F.. At −128° F. some foods, such for example as cherries and tomatoes, have a tendency to crack or explode when directly immersed in liquid nitrous-oxide. Such foods may nevertheless be processed at this temperature by providing a coating, wrapping or package having some insulation value. However, such wrapping or insulation is unnecessary for most foods at −40° F. so that at this temperature the freezing is completed as rapidly without insulation as at the lower temperatures with some insulation present. I therefore complete the freezing operation as rapidly as it may be done for the particular product and also operate my system more efficiently since, with the system operated at a pressure of 150 pounds absolute on the low side, the pressure differential between the high side and low side of the system will be less, thereby permitting operation more efficiently and economically as is well known. For this purpose I use a suction pressure regulator 15 between the surge drum and gasometer. This permits me to freeze each product at the optimum temperature and operate the system at the optimum efficiency, and of easily varying the liquid refrigerant pressure to readily control the temperature. In the case of any products requiring still a higher temperature, wrapping may be used, so that my system may be used for all products while permitting ultrafast freezing where this is desirable.

If due to freezing at a relatively high temperature the resulting compressor suction pressure rises to a point of causing too high a pressure on the gasometer, the gasometer can be bypassed through bypass 20 by opening valve 21 and closing valves 22 and 23.

I have discovered by experiment that it is necessary to precool some products to a temperature very close to the freezing point to prevent rupture during freezing, due to the freezing of the surface while the inside is still warm. For example, attempts to fast-freeze tomatoes have heretofore been unsuccessful, but I have discovered that they may be fast-frozen if precooled and then frozen at not too low temperature, and still retain their original shape and flavor after thawing.

Figure 2:
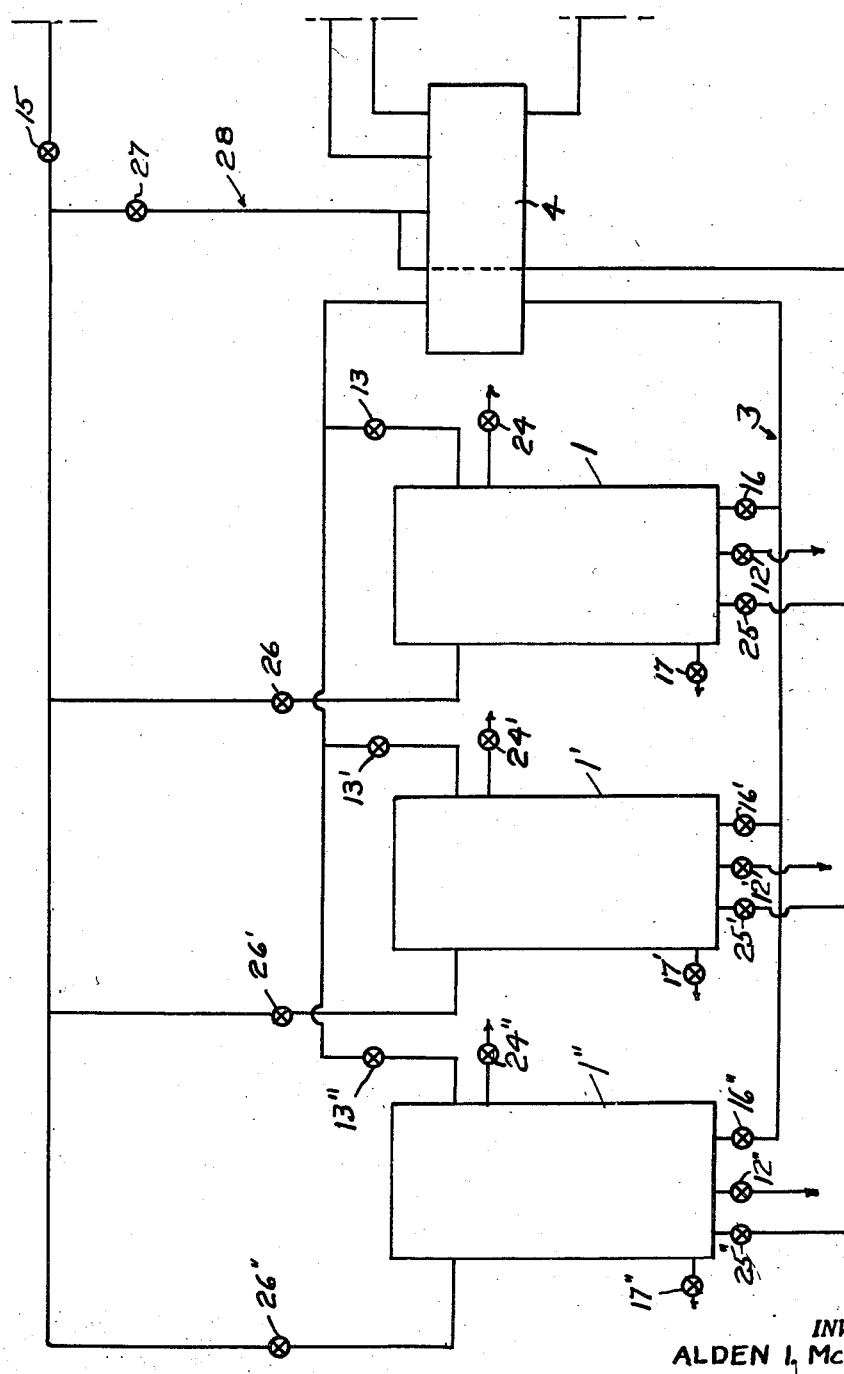
Figure 2 is a diagrammatic illustration of a modification.

In Figure 2 I have illustrated an apparatus which permits the cold suction gas to be used to precool a second drum while a third drum is being emptied and refilled. This precooling of the product by superheating the refrigerant vapor permits the freezing of such products as tomatoes and also offers the economical advantage of removing useful refrigerant from the gas, thus increasing the efficiency of the system.

This superheating also allows the gas to enter the compressor at a higher temperature than would otherwise be possible, permitting the use of cast iron or other materials for the compressor cylinder, etc., which would otherwise be unsatisfactory due to the low temperature. About −50° F. or higher must be maintained at the entrance to the compressor to avoid the use of stainless steel or other materials especially suitable for temperatures below −50 degrees F. Thus, further economies are effected by the precooling and the use of a plurality of drums. This control of temperature by means of the suction pressure will also permit many unpackaged products to be frozen in low boiling refrigerants, which would be impossible by immersion at atmospheric pressure.

In Figure 2 I have again shown the surge drum 4 of Figure 1 and have repeated all the other apparatus shown in Figure 1 to the left of the surge drum, using the same reference numerals for the same parts. It will be understood that the apparatus to the right of the surge drum in Figure 1 will also be present in Figure 2, but is omitted from the drawing for simplicity.

In the apparatus of Figure 2, any one of the three drums 1, 1', or 1" may be used singly, just as the single drum 1 was used in Figure 1, by manipulating the valves having corresponding numbers with the corresponding primes, and by opening valve 27 in the bypass 28. They may also be used in combination.

If, for example, the product in drum 1 is being frozen while the product in drum 1' is being precooled, valves 13, 16, 25' and 26' will be opened while the remaining valves will be closed, except that valves 12" and 17" may be opened to empty and refill drum 1". Refrigerant liquid will then pass through pipe 3 into drum 1. Gaseous refrigerant from surge drum 4 will pass through valve 25' into drum 1' and thence through valve 26' to the gasometer or to the compressor if the gasometer is bypassed, ultimately returning as liquid refrigerant to the surge drum 4. Thus, the product in drum 1 will be frozen while the product in drum 1' is precooled. After the completion of the freezing of the product in drum 1, valve 13 will be closed, forcing the liquid refrigerant in drum 1 back into the surge drum 4 through valve 16. After all the liquid refrigerant has been forced out of drum 1, valves 12 and 17 may be opened to release the pressure within the drum 1, permitting drum 1 to be opened and the contents removed therefrom.

While the product in drum 1 was being frozen drum 1' will have been loaded with a product undergoing precooling. The next step in the process will be to freeze the product in drum 1' while precooling the product in drum 1". In order to accomplish this, valves 25' and 26' will be closed, valves 13', 16', 25" and 26" will be opened while the remaining valves will remain closed. Liquid refrigerant will then pass through valve 16' into the drum 1'. The gaseous refrigerant from surge drum 4 will then pass through valve 25" into the drum 1" and thence through valve 26" to the gasometer or compressor. When the product in drum 1' has been frozen, valve 13' will be closed, forcing the liquid refrigerant from drum 1' back through valve 16' to the surge drum 4. When all the liquid refrigerant has been forced out of the drum 1', valve 13' being then closed, valve 16' will be closed and valve 12' opened to release the pressure in drum 1', at which time drum 1' may be opened and the product removed therefrom.

The next step is to freeze the product in drum 1" while pre-cooling the product in drum 1. For this purpose valves 13", 16", 25 and 26 will be opened while the remaining valves of the system will remain closed. The liquid refrigerant will then pass through valve 16" to drum 1". The gaseous refrigerant will then pass from the surge drum 4 through valve 25 to drum 1 and thence through valve 26 to the compressor, precooling the product in drum 1. After the freezing operation drum 1" may have its refrigerant removed by closing valve 13, as in the previous cases.

The drums may, of course, be filled, precooled, frozen and emptied in any order and in any combination.

It will be understood of course that all valves may be hand, solenoid or motor operated and that combinations of valves may be automatically and simultaneously operated to function as a unit.

Figure 3:
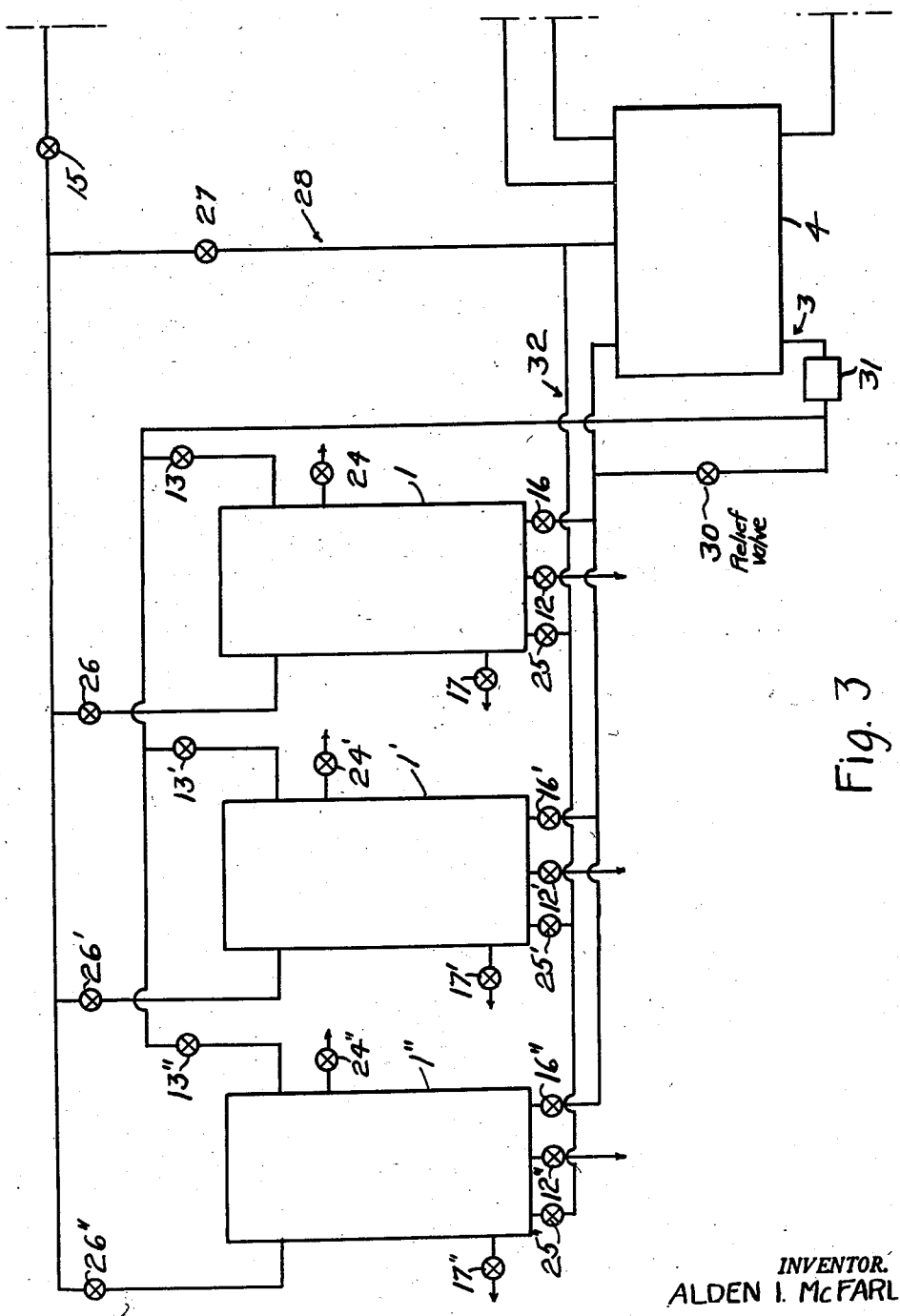
Figure 3 is similar to Figure 2 but illustrates the use of a pump for circulating the liquid refrigerant.

In large installations where the size of the pipes may become too large, or where many drums are used on the same circuit, a pump or pumps may be used to circulate the refrigerant, as shown in Figure 3. In this case, the positions of valves 13 and 16 (and their primes) are interchanged and the liquid refrigerant pump 31 is installed in the liquid line 3, supplying valve 16 from accumulator or surge tank 4. Also a relief valve 30 is installed across lines 3 and 32 to protect the pump in the event valves 13, 13' and 13" are all closed or if either 13 or 16 (or their primes) are closed in the drum in which freezing is taking place.

It will be obvious to those skilled in the art that my invention is capable of various modifications, and I do not desire, therefore, to be restricted to the precise details shown and described but only within the scope of the appended claims.

What is claimed is:

1. Apparatus for fast freezing of products by immersion in a liquid refrigerant, comprising a vessel within which the product is to be frozen, an accumulator communicating with said vessel, a gasometer communicating with the accumulator, a purifying device communicating with the gasometer, a compressor communicating with the purifying device, a condenser communicating with the compressor, a high pressure liquid refrigerant receiver communicating with the condenser and with the accumulator, and means for supplying liquid refrigerant to the vessel for a freezing operation and removing liquid refrigerant from the vessel following each freezing operation.

2. Apparatus for the fast freezing of products by immersion in a liquid refrigerant comprising a plurality of vessels within which said product is to be frozen, means for supplying liquid refrigerant to one vessel and the exhaust refrigerant therefrom to a second vessel to precool the product in the second vessel while freezing the product in the first vessel, and means for conveying liquid refrigerant to the second vessel and the exhaust refrigerant from the second vessel to the first vessel to freeze the product in the second vessel while precooling the product in the first vessel.

3. Apparatus for the fast freezing of products by immersion in a liquid refrigerant having a surge drum, gasometer, a compressor, a condenser, and a refrigerant receiver, comprising in combination a plurality of vessels, means whereby one of said vessels may be filled with liquid refrigerant while another of said vessels is filled with the exhaust refrigerant from said first vessel, and a suction pressure regulator to control the pressure within said vessels.

4. The method of fast freezing products by immersion in a non-toxic liquid refrigerant which comprises placing the products in a vessel having an inlet and two outlets, said two outlets being in communication with a low pressure receiver connected to a liquid refrigerant pump operating the said pump to circulate the refrigerant, closing the inlet and one of said outlets to the said vessel and allowing the remaining liquid refrigerant to drain out of the vessel through the other of said outlets and into an accumulator, thereby displacing the liquid refrigerant in the vessel with refrigerant vapor.

5. Apparatus for fast freezing of products by immersion in a liquid refrigerant comprising a vessel within which the product is to be frozen, an accumulator communicating with said vessel, a purifying device communicating with the accumulator, a compressor communicating with the purifying device, a condenser communicating with the compressor and with the accumulator, and means for supplying liquid refrigerant to the vessel for a freezing operation and removing liquid refrigerant from the vessel following each freezing operation.

6. Apparatus for fast freezing of products by immersion in a liquid refrigerant comprising a vessel within which the product is to be frozen, an accumulator communicating with said vessel, a purifying device communicating with the accumulator, a compressor communicating with the purifying device, a condenser communicating with the compressor, and means for supplying liquid refrigerant to the vessel for a freezing operation and removing liquid refrigerant from the vessel following each freezing operation.

ALDEN I. McFARLAN.

REFERENCES CITED

The following references are of record in the file of this patent:

UNITED STATES PATENTS

| Number | Name | Date |
|---|---|---|
| 1,866,989 | Shipley | July 12, 1932 |
| 1,866,991 | Zieber | July 12, 1932 |
| 1,898,758 | Bottoms | Feb. 21, 1933 |
| 1,944,857 | Atwell | Jan. 23, 1934 |
| 2,137,902 | Walter | Nov. 22, 1938 |
| 2,181,855 | McCloy | Nov. 28, 1939 |
| 2,406,241 | Morrison | Aug. 20, 1946 |
| 2,437,332 | Newton | Mar. 9, 1948 |